(12) United States Patent
Dellinger

(10) Patent No.: US 12,552,133 B2
(45) Date of Patent: *Feb. 17, 2026

(54) COMPOSITIONS INCORPORATING SILICA FIBERS

(71) Applicant: American Nano, LLC., Clemmons, NC (US)

(72) Inventor: Mitch Dellinger, Clemmons, NC (US)

(73) Assignee: American Nano, LLC, Clemmons, NC (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/542,960

(22) Filed: Dec. 18, 2023

(65) Prior Publication Data

US 2024/0116268 A1 Apr. 11, 2024

Related U.S. Application Data

(63) Continuation of application No. 17/408,631, filed on Aug. 23, 2021, now Pat. No. 11,878,501, which is a
(Continued)

(51) Int. Cl.
*B32B 5/26* (2006.01)
*B65D 41/00* (2006.01)
(Continued)

(52) U.S. Cl.
CPC ............... *B32B 5/26* (2013.01); *B65D 41/00* (2013.01); *C01B 33/113* (2013.01);
(Continued)

(58) Field of Classification Search
CPC .......... C08K 3/00; D01D 5/38; D01D 5/0038; C01B 33/113; C04B 35/624;
(Continued)

(56) References Cited

U.S. PATENT DOCUMENTS 6,051,096 A 4/2000 Nagle et al.
10,111,783 B1 * 10/2018 Dellinger .............. C01B 33/126
(Continued)

FOREIGN PATENT DOCUMENTS

CN 102652903 A 9/2012
CN 104177877 A 12/2014
(Continued)

OTHER PUBLICATIONS

Wei Lu, et al., "Preparation of Silica Nano-fiber by Electrostatic Spinning," Journal of Fujian Normal University (Natural Science Edition), vol. 30, No. 1, pp. 85-90 (Jan. 2014).

*Primary Examiner* — Monica A Huson
(74) *Attorney, Agent, or Firm* — Morgan, Lewis & Bockius LLP

(57) ABSTRACT

Embodiments of the invention include articles incorporating fibrous fragments of mats of silica fibers and methods for producing such articles. The fiber mats may be formed via electrospinning of a sol gel produced with a silicon alkoxide reagent, such as tetraethyl ortho silicate, alcohol solvent, and an acid catalyst.

20 Claims, 14 Drawing Sheets

Related U.S. Application Data continuation of application No. 16/353,181, filed on Mar. 14, 2019, now Pat. No. 11,135,806, which is a continuation-in-part of application No. 16/131,531, filed on Sep. 14, 2018, now abandoned, which is a continuation-in-part of application No. 15/934,599, filed on Mar. 23, 2018, now Pat. No. 10,111,783.

(60) Provisional application No. 62/795,610, filed on Jan. 23, 2019, provisional application No. 62/643,946, filed on Mar. 16, 2018, provisional application No. 62/710,305, filed on Feb. 16, 2018.

(51) Int. Cl.
| | |
|---|---|
| *C01B 33/113* | (2006.01) |
| *C04B 35/622* | (2006.01) |
| *C04B 35/624* | (2006.01) |
| *C08K 3/00* | (2018.01) |
| *C09J 11/00* | (2006.01) |
| *D01D 5/00* | (2006.01) |
| *D01D 5/38* | (2006.01) |
| *F04B 39/00* | (2006.01) |

(52) U.S. Cl.
CPC ........ *C04B 35/6224* (2013.01); *C04B 35/624* (2013.01); *C08K 3/00* (2013.01); *C09J 11/00* (2013.01); *D01D 5/0038* (2013.01); *D01D 5/38* (2013.01); *F04B 39/00* (2013.01); *C04B 2235/441* (2013.01); *C04B 2235/5256* (2013.01); *C04B 2235/526* (2013.01); *C04B 2235/5264* (2013.01)

(58) Field of Classification Search
CPC ........ C04B 35/6224; C04B 2235/5264; C04B 2235/441; C04B 2235/5256; C04B 2235/526; F04B 39/00; B65D 41/00; C09J 11/00; B32B 5/26
See application file for complete search history.

(56) References Cited

U.S. PATENT DOCUMENTS

| | | |
|---|---|---|
| 2003/0005723 A1 | 1/2003 | Kawabe et al. |
| 2010/0022932 A1 | 1/2010 | Thierau et al. |
| 2014/0037894 A1 | 2/2014 | Higuchi et al. |
| 2014/0225329 A1 | 8/2014 | Hayashi et al. |
| 2017/0020915 A1 | 1/2017 | Baecker et al. |
| 2019/0363341 A1 | 11/2019 | Dellinger et al. |
| 2020/0129661 A1 | 4/2020 | Dellinger et al. |

FOREIGN PATENT DOCUMENTS

| | | |
|---|---|---|
| CN | 104789175 A | 7/2015 |
| CN | 105133298 A | 12/2015 |
| CN | 106147143 A | 11/2016 |
| CN | 106957528 A | 7/2017 |
| JP | H07-82462 A | 3/1995 |

\* cited by examiner

COMPOSITIONS INCORPORATING SILICA FIBERS

RELATED APPLICATIONS

This application is a continuation of U.S. patent application Ser. No. 17/408,631, filed Aug. 23, 2021, which is a continuation of U.S. patent application Ser. No. 16/353,181, filed Mar. 14, 2019, which is a continuation-in-part of U.S. patent application Ser. No. 16/131,531, filed Sep. 14, 2018, which is a continuation-in-part of U.S. patent application Ser. No. 15/934,599, filed Mar. 23, 2018, which claims the benefit of and priority to U.S. Provisional Patent Application No. 62/710,305, filed Feb. 16, 2018, and U.S. Provisional Patent Application No. 62/643,946, filed Mar. 16, 2018, the entire disclosure of each of which is hereby incorporated herein by reference. U.S. patent application Ser. No. 16/353,181, filed Mar. 14, 2019, also claims the benefit of and priority to U.S. Provisional Patent Application No. 62/643,946, filed Mar. 16, 2018, and U.S. Provisional Patent Application No. 62/795,610, filed Jan. 23, 2019, the entire disclosure of each of which is hereby incorporated herein by reference.

TECHNICAL FIELD

In various embodiments, the present invention relates to compositions incorporating silica fibers as an additive.

BACKGROUND

Silicon dioxide, i.e., silica, is one of the most abundant materials on Earth, being the major component of most types of sand. Silica has several advantageous properties that have resulted in its use in many different industries and products. For example, the high electrical resistance of silica has enabled its use as a high-performance insulator in microelectronic devices, e.g., as the gate-dielectric material in field-effect transistors. Silica is also utilized in the production of glass usable in many different applications. Optical fibers, for example, are fabricated utilizing silica and have enabled the formation and growth of worldwide optical telecommunications networks.

Silica has also been utilized at the microscopic scale, as silica particles have been utilized as abrasive agents, as desiccants, and to form molds for investment casting of metallic materials. However, the physical properties and composition of nano- and micro-scale silica materials can vary substantially, such that various advantageous properties of silica have not been adequately harnessed in various compositions and materials. Thus, there is a need for improved materials that incorporate silica, as well as silica-based additives and techniques for fabricating them.

SUMMARY

In accordance with various embodiments of the present invention, fibrous fragments of silica fibers (e.g., fragments of non-woven mats of silica fibers) are utilized as an additive in various different compositions to improve one or more mechanical and/or thermal properties thereof. The silica fibers themselves may be produced from a gelatinous material that is electrospun to form a fiber mat. For example, the fibers may be prepared by electrospinning a sol-gel, which may be prepared with a silicon alkoxide reagent, such as tetraethyl ortho silicate (TEOS), alcohol solvent, and an acid catalyst. In various embodiments, the sol-gel is produced via ripening of sol under controlled environmental conditions, and/or the properties of the sol or sol-gel during the ripening process are monitored, in order to identify various processing windows during which the electrospinning of the sol-gel may be successfully performed. As known in the art, a "sol" is a colloidal solution that gradually evolves towards the formation of a "gel," i.e., a diphasic system containing both a liquid phase and solid phase. Herein, the term "sol-gel" is used to refer to the gel produced from the sol-gel process that may be electrospun into fibers or a fibrous mat.

In various embodiments, the controlled environment for ripening (or "transitioning") the sol may involve controlled conditions in terms of humidity, temperature, and optionally barometric pressure. For example, the humidity may be controlled within the range of about 30% to about 90% or from about 40% to about 80%, and the temperature may be controlled within the range of from about 50° F. to about 90° F. By controlling the environmental conditions during ripening, the gel may be electrospun during the time when spinning is optimal, which can occur in a very small window of only several minutes if the ripening process is accelerated by direct heat. When ripening the sol at a constant humidity in the range of about 50% to 70% or 80% and a temperature of about 60 to 80° F., the sol will ripen (gelatinize) in a few days, and the window for successful electrospinning may be expanded to at least several hours, and in some embodiments several days. The sol may therefore be ripened in an enclosure which may include one or more environmental monitors, such as a temperature reading device and/or a humidity reading device. Further, gases produced or released by the sol during the ripening process and/or relative weight of the sol may be monitored to determine a suitable or optimal time for electrospinning.

Once the sol is adequately ripened into a sol-gel, it is electrospun to form a mat of entangled silica fibers. Once electrospun, the silica fibers may have a variable diameter, such as in the range of from about 50 nm to 5 µm. In some embodiments, the fibers are predominately in the range of about 100 nm to about 2 µm, or predominately in the range of about 200 to about 1000 nm. After the silica-fiber mat is successfully formed, it is, in various embodiments, divided into small fibrous fragments that are utilized as an additive in any of a variety of different compositions. For example, the electrospun mat may be "fragmented," i.e., fractured, cut, ground, milled, or otherwise divided into small fragments that maintain a fibrous structure. As utilized herein, the term "fibrous fragments" (or "fibrous-mat fragments," or simply "fragments") refers to small particles, parts, or flakes of a fibrous mat having an average dimension larger (e.g., 5×, 10×, or even 100×) than the width of at least some of the fibers of the mat. In various embodiments, the average size of a fibrous fragment is in the range of approximately 20 µm to approximately 200 µm. Fibrous fragments may thus resemble microscopic-scale versions of the electrospun mat itself, e.g., intertwined collections of silica fibers, and thus typically are porous and have low densities. Thus, fibrous fragments may be contrasted with other types of micro-scale particles, such as the substantially spherical particles utilized in colloidal silica, which are each unitary, individual units or grains, rather than small collections of fibers. Various portions of a fibrous fragment (e.g., the edges) may have sharp and/or broken edges resulting from the fracturing process utilized to form the fragments from the electrospun mat.

After the fibrous silica fragments have been prepared, they may be mixed with a (typically liquid or gelatinous) composition in order to impart advantageous thermal and/or mechanical properties thereto. For example, the fibrous fragments may be incorporated within paints and/or other coatings in order to increase the thermal resistance per unit area (i.e., the "R-value") of the composition once it is applied. In other embodiments, the fibrous fragments are added to structural compositions, such as epoxies or urethanes (and/or resins and/or binders, or mixtures containing such resins, binders, epoxies, and urethanes), in order to increase the mechanical strength and/or impact resistance of the material once it is formed (e.g., molded, pressed, and/or extruded) into a solid object (e.g., a composite material incorporating the fibrous fragments and one or more structural compositions). Exemplary embodiments of the invention also include particle board incorporating silica fibrous fragments incorporated therewithin and/or thereon.

Embodiments of the present invention may utilize silica fibers, fragments thereof, and/or compositions incorporating such fibers or fragments, and/or methods for fabricating such fibers or fragments detailed in U.S. patent application Ser. No. 15/934,599, filed on Mar. 23, 2018, and U.S. patent application Ser. No. 16/131,531, filed on Sep. 14, 2018, the entire disclosure of each of which is incorporated by reference herein.

In an aspect, embodiments of the invention feature a method of making a composition. A sol-gel is electrospun to form a mat (e.g., a non-woven mat) of silica fibers. The mat is fragmented to form a plurality of fibrous fragments each composed of a plurality of silica fibers or portions thereof. The fibrous fragments are mixed into a liquid composition to form a modified composition.

Embodiments of the invention may include one or more of the following in any of a variety of combinations. The liquid composition may include, consist essentially of, or consist of a paint, an epoxy, a urethane, and/or an adhesive. The sol-gel may be prepared with tetraethyl orthosilicate (TEOS). Prior to electrospinning the sol-gel, the sol-gel may be produced from an initial sol including, consisting essentially of, or consisting of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 7 days. The sol-gel may be electrospun when the weight is at from 20% to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning). The fibrous fragments may have an average size (e.g., average diameter, length, width, or other dimension) ranging from approximately 20 μm to approximately 200 μm. The fibers or portions thereof within the fibrous fragments may have a variable diameter of from about 50 nm to about 5 μm. The fibers or portions thereof within the fibrous fragments may have a variable diameter of from about 200 nm to about 1000 nm. The modified composition may be applied as a coating to a solid object. Heat may be applied to the coated solid object, and the coating may retard transfer of heat through the coating. The modified composition may be molded into a solid object.

In another aspect, embodiments of the invention feature a composition that includes, consists essentially of, or consists of a liquid carrier and, dispersed within the liquid carrier, a plurality of silica fibrous fragments each composed of a plurality of silica fibers or portions thereof.

Embodiments of the invention may include one or more of the following in any of a variety of combinations. The liquid carrier may include, consist essentially of, or consist of a paint, an epoxy, a urethane, and/or an adhesive. The fibrous fragments may have an average size (e.g., average diameter, length, width, or other dimension) ranging from approximately 20 μm to approximately 200 μm. The fibers or portions thereof within the fibrous fragments may have a variable diameter of from about 50 nm to about 5 μm. The fibers or portions thereof within the fibrous fragments may have a variable diameter of from about 200 nm to about 1000 nm.

The fibrous fragments may be fragments of a mat (e.g., a non-woven mat) of silica fibers formed by electrospinning a sol-gel. The sol-gel may be prepared with tetraethyl orthosilicate (TEOS). Prior to electrospinning the sol-gel, the sol-gel may be produced from an initial sol including, consisting essentially of, or consisting of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCL. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 7 days. The sol-gel may be electrospun when the weight is at from 20% to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning).

In yet another aspect, embodiments of the invention feature a composition that includes, consists essentially of, or consists of a liquid carrier and, dispersed within the liquid carrier, a plurality of silica fibers or portions thereof.

Embodiments of the invention may include one or more of the following in any of a variety of combinations. The liquid carrier may include, consist essentially of, or consist of a paint, an epoxy, a urethane, and/or an adhesive. The fibers or portions thereof may have a variable diameter of from about 50 nm to about 5 μm. The fibers or portions thereof may have a variable diameter of from about 200 nm to about 1000 nm.

The fibers or portions thereof may be portions of (e.g., a powder formed from) a mat (e.g., a non-woven mat) of silica fibers formed by electrospinning a sol-gel. The sol-gel may be prepared with tetraethyl orthosilicate (TEOS). Prior to electrospinning the sol-gel, the sol-gel may be produced from an initial sol including, consisting essentially of, or consisting of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sot may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 7 days. The sol-gel may be electrospun when the weight is at from 20% to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning).

In another aspect, embodiments of the invention feature a composition that includes, consists essentially of, or consists of a polymeric solid and, dispersed within the polymeric solid, a plurality of silica fibrous fragments each composed of a plurality of silica fibers or portions thereof.

Embodiments of the invention may include one or more of the following in any of a variety of combinations. The polymeric solid may include, consist essentially of, or consist of an epoxy and/or a urethane. The fibrous fragments may have an average size (e.g., average diameter, length, width, or other dimension) ranging from approximately 20 μm to approximately 200 μm. The fibers or portions thereof within the fibrous fragments may have a variable diameter of from about 50 nm to about 5 μm. The fibers or portions thereof within the fibrous fragments may have a variable diameter of from about 200 nm to about 1000 nm.

The fibrous fragments may be fragments of a mat (e.g., a non-woven mat) of silica fibers formed by electrospinning a sol-gel. The sol-gel may be prepared with tetraethyl orthosilicate (TEOS). Prior to electrospinning the sol-gel, the sol-gel may be produced from an initial sol including, consisting essentially of, or consisting of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCl. The initial sol may contain less than about 0.1% of the acid catalyst by weight. The initial sol may contain from 0.02% to 0.08% of the acid catalyst by weight. The initial sot may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sot may be allowed to transition for at least 3 days, at least 4 days, at least 5 days, at least 6 days, or at least 7 days. The initial sol may be allowed to transition for 2 days to 7 days. The sol-gel may be electrospun when the weight is at from 20% to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning).

In yet another aspect, embodiments of the invention feature a composition that includes, consists essentially of, or consists of a polymeric solid and, dispersed within the polymeric solid, a plurality of silica fibers or portions thereof.

Embodiments of the invention may include one or more of the following in any of a variety of combinations. The polymeric solid may include, consist essentially of, or consist of an epoxy and/or a urethane. The fibers or portions thereof may have a variable diameter of from about 50 nm to about 5 μm. The fibers or portions thereof may have a variable diameter of from about 200 nm to about 1000 nm.

The fibers or portions thereof may be portions of (e.g., a powder formed from) a mat (e.g., a non-woven mat) of silica fibers formed by electrospinning a sol-gel. The sol-gel may be prepared with tetraethyl orthosilicate (TEOS). Prior to electrospinning the sol-gel, the sol-gel may be produced from an initial sol including, consisting essentially of, or consisting of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 7 days. The sol-gel may be electrospun when the weight is at from 20% to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning).

In another aspect, embodiments of the invention feature a method of making a composition. An initial sol is prepared. The initial sol includes, consists essentially of, or consists of 70% to 90% tetraethylorthosilicate (TEOS), 8% to 25% anhydrous ethanol, an acid catalyst, and water. The initial sol may contain 70% to 90% TEOS, 8% to 25% anhydrous ethanol, an acid catalyst, and the balance water. The initial sol is ripened for at least 2 days at a humidity of 40% to 80% and a temperature of 50° F. to 90° F. to form a sol-gel. The sol-gel is electrospun to form a mat (e.g., a non-woven mat) of silica fibers. At least a portion of the mat is coated with a liquid composition or immersed within a liquid composition. The liquid composition is cured (e.g., via application of heat and/or light (e.g., ultraviolet light)).

Embodiments of the invention may include one or more of the following in any of a variety of combinations. The liquid composition may include, consist essentially of, or consist of a paint, an epoxy, a urethane, and/or an adhesive. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

The initial sol may be allowed to transition for at least 3 days, at least 4 days, at least 5 days, at least 6 days, or at least 7 days. The initial sol may be allowed to transition for 2 days to 7 days. The sol-gel may be electrospun when the weight is at from 20% to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning).

In yet another aspect, embodiments of the invention feature a composition that includes, consists essentially of, or consists of a polymeric solid and, embedded within (i.e., at least partially disposed within or entirely disposed within) the polymeric solid, a non-woven mat of silica fibers.

Embodiments of the invention may include one or more of the following in any of a variety of combinations. The polymeric solid may include, consist essentially of, or consist of an epoxy and/or a urethane. The mat of silica fibers may be formed, at least in part, by electrospinning a sol-gel. The sol-gel may be prepared with tetraethyl orthosilicate (TEOS). Prior to electrospinning the sol-gel, the sol-gel may be produced from an initial sol including, consisting essentially of, or consisting of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may include, consist essentially of, or consist of 70% to 900% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sot for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sot may be allowed to transition for 2 days to 7 days. The sol-gel may be electrospun when the weight is at from 20% to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning).

In another aspect, embodiments of the invention feature a particle board that includes, consists essentially of, or consists of one or more binders, a plurality of wood particles dispersed within the one or more binders, and, dispersed within the one or more binders, a plurality of silica fibrous fragments each composed of a plurality of silica fibers or portions thereof.

Embodiments of the invention may include one or more of the following in any of a variety of combinations. The one or more binders may include, consist essentially of, or consist of one or more resins. The fibrous fragments may have an average size (e.g., average diameter, length, width, or other dimension) ranging from approximately 20 µm to approximately 200 µm. The fibers or portions thereof within the fibrous fragments may have a variable diameter of from about 50 nm to about 5 µm. The fibers or portions thereof within the fibrous fragments may have a variable diameter of from about 200 nm to about 1000 nm.

The fibrous fragments may be fragments of a mat (e.g., a non-woven mat) of silica fibers formed by electrospinning a sol-gel. The sol-gel may be prepared with tetraethyl orthosilicate (TEOS). Prior to electrospinning the sol-gel, the sol-gel may be produced from an initial sol including, consisting essentially of, or consisting of 70% to 90% TEOS by weight, 8% to 25% ethanol by weight, an acid catalyst, and water. The initial sot may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sot may include, consist essentially of, or consist of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 7 days. The sol-gel may be electrospun when the weight is at from 20% to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning).

In yet another aspect, embodiments of the invention feature a particle board that includes, consists essentially of, or consists of one or more binders, a plurality of wood particles dispersed within the one or more binders, and, dispersed within the one or more binders, a plurality of silica fibers or portions thereof.

Embodiments of the invention may include one or more of the following in any of a variety of combinations. The one or more binders may include, consist essentially of, or consist of one or more resins. The fibers or portions thereof may have a variable diameter of from about 50 nm to about 5 µm. The fibers or portions thereof may have a variable diameter of from about 200 nm to about 1000 nm.

The fibers or portions thereof may be fragments of a mat (e.g., a non-woven mat) of silica fibers formed by electrospinning a sol-gel. The sol-gel may be prepared with tetraethyl orthosilicate (TEOS). Prior to electrospinning the sol-gel, the sol-gel may be produced from an initial sol including, consisting essentially of, or consisting of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may include, consist essentially of, or consist of 70% to 90% TEOS by weight, 8% to 25% ethanol by weight, an acid catalyst, and water. The initial sol may include, consist essentially of, or consist of 70% to 90% TEOS by weight, 8% to 25% ethanol by weight, 1% to 10% water by weight, and the acid catalyst. The initial sol may include, consist essentially of, or consist of 75% to 85% by weight TEOS, 12% to 20% by weight ethanol, and about 2% to 5% by weight water. The initial sol may include, consist essentially of, or consist of about 80% by weight TEOS, about 17% by weight ethanol, and about 3% by weight water. The acid catalyst may include, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 7 days. The sol-gel may be electrospun when the weight is at from 20%/o to 40% of the starting weight of the initial sol before ripening (transitioning). The sol-gel may be electrospun when the production of ethylene vapor is 10% to 20% relative to the peak production of ethylene vapors during ripening (transitioning) of the initial sol. The sol-gel may be electrospun when the production of ethylene vapor therefrom is 10% to 40% relative to the initial sol before ripening (transitioning).

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately," "about," and "substantially" mean±10%, and in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
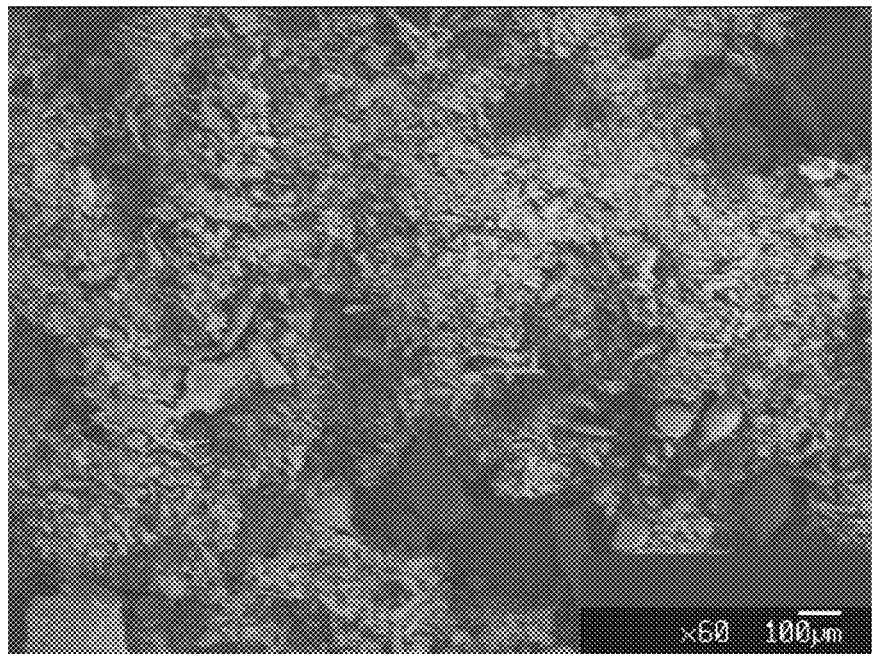
FIGS. 1A and 1B are scanning electron microscopy (SEM) images of collections of silica fibrous fragments produced in accordance with embodiments of the present invention.

In various embodiments of the present invention, various properties of compositions (e.g., thermal and/or mechanical properties) are enhanced via the addition of fibrous fragments of silica fiber mats. The silica fiber mat from which the fragments are formed may be fabricated via sol-gel processing followed by electrospinning. In some embodiments, the sol-gel for preparing the silica fiber mat is prepared by a method that includes preparing a first mixture containing an alcohol solvent, a silicon alkoxide reagent such as tetraethylorthosilicate (TEOS); preparing a second mixture containing an alcohol solvent, water, and an acid catalyst; fully titrating the second mixture into the first mixture; and processing (ripening) the combined mixture to form a gel for electrospinning. In some embodiments, the silicon alkoxide reagent is TEOS. Alternative silicon alkoxide reagents include those with the formula $Si(OR)_4$, where R is from 1 to 6, and preferably 1, 2, or 3.

In some embodiments, the sol includes, consists essentially of, or consists of about 70% to about 90% by weight silicon alkoxide (e.g., TEOS), about 5% to about 25% by weight alcohol solvent (e.g., anhydrous ethanol), an acid catalyst (e.g., less than about 0.1% by weight when using HCl) and water. Any sol or sol-gel described herein may include the balance water (i.e., water may constitute any amount of the sol or sol-gel that is otherwise unspecified). Any sol or sol-gel described herein may optionally contain one or more reagents that may or do alter one or more properties of the sol, the sol-gel, and/or the silica fibers. Such reagents may include, but are not limited to, for example, polymers and polymeric solutions, inert reagents, alcohols, organic and/or aqueous solvents, organic salts, inorganic salts, metals, metal oxides, metal nitrides, metal oxynitrides, carbon (e.g., graphene, graphite, fullerenes, etc.), etc.

In some embodiments, the sol contains 70% to 90% tetraethyl orthosilicate (TEOS) by weight, 8% to 25% ethanol by weight, 1% to 10% water by weight, and an acid catalyst. In some embodiments, the sol contains 75% to 85% by weight TEOS, 12% to 20% by weight ethanol, and about 2% to 5% by weight water. An exemplary sol contains about 80% by weight TEOS, about 17% by weight ethanol, and about 3% by weight water. In some embodiments, the acid catalyst is HCl. For example, the sol may contain less than about 0.1% HCl by weight. For example, the sol may contain from 0.02% to 0.08% HCl by weight. In various embodiments, the sol does not contain an organic polymer, or other substantial reagents, such that the fiber composition will be substantially pure $SiO_2$. In various embodiments, the sol does not include inorganic salts (e.g., sodium chloride, lithium chloride, potassium chloride, magnesium chloride, calcium chloride, and/or barium chloride), nor are, in various embodiments, inorganic salts mixed with other components of the sol or into the sol itself. In various embodiments, the fiber composition does not include metals or metal oxides (e.g., $TiO_2$ or $ZrO_2$). In various embodiments, the fiber composition consists essentially of $SiO_2$, i.e., contains only $SiO_2$ and unintentional impurities, and, in some embodiments, species and/or complexes resulting from the incomplete conversion of the sol to $SiO_2$ (e.g., water and/or chemical groups such as ethoxy groups, silanol groups, hydroxyl groups, etc.).

In some embodiments, the alcohol solvent is an anhydrous denatured ethanol, or in some embodiments, methanol, propanol, butanol or any other suitable alcohol solvent. The first mixture may be agitated, for example, using a magnetic stirrer, vibration platform or table, or other agitation means. The second mixture contains an alcohol solvent, water, and an acid catalyst. The alcohol solvent may be an anhydrous denatured alcohol, or may be methanol, propanol, butanol or any other suitably provided alcohol solvent. Water may be distilled water or deionized water. Enough acid catalyst is added to the mixture to aid in the reaction. This acid catalyst may be hydrochloric acid, or may be sulfuric acid or other suitable acid catalyst. The second mixture may be agitated, for example, magnetic stirrer, vibration platform or table, or other agitation means. In some embodiments, the first mixture (or sol) and the second mixture (or sol) are created without the use of direct heat (i.e., heat applied via extrinsic means such as a hot plate or other heat source).

According to various embodiments, the first mixture and the second mixture are combined by dripping or titrating the second mixture into the first mixture, preferably with agitation. The combined mixture is then further processed by allowing the sol to ripen in a controlled environment until a substantial portion of the alcohol solvent has evaporated to create a sol-gel suitable for electrospinning. For example, the controlled environment may include an enclosure with at least one vent and optionally a fan to draw gases away from the mixture, and which may involve controlled conditions in terms of humidity, temperature, and optionally barometric pressure. For example, the humidity may be controlled (e.g., via use of conventional humidifiers and/or dehumidifiers) within the range of about 30% to about 90%, such as from about 40% to about 80%, or in some embodiments, from about 50% to about 80%, or from about 50% to about 70% (e.g., about 55%, or about 60%, or about 65%). Some humidity may be helpful to slow evaporation of solvent, and thereby lengthen the window for successful electrospinning. In some embodiments, the temperature is in the range of from about 50° F. to about 90° F., such as from about 60° F. to about 80° F., or from about 65° F. to about 75° F. In various embodiments, the sol is not exposed to heat over 150° F. or heat over 100° F., so as to avoid accelerating the transition. In some embodiments, barometric pressure is optionally controlled (e.g., using a low pressure vacuum source such as a pump or a fan). By controlling the environmental conditions during ripening, the time period during which the gel may be electrospun may be lengthened; this time period may be a small window of only several minutes if the ripening process is too accelerated, such as with direct heat. When ripening the sol at a constant humidity of about 55% and temperature of about 72° F., the sol will ripen (gelatinize) in a few days, and the window for successful electrospinning may be expanded to at least several hours, and in some embodiments several days. In various embodiments, the ripening process takes at least 2 days, or at least 3 days in some embodiments. However, in various embodiments the ripening does not take more than 10 days, or more than 7 days. In some embodiments, the ripening process takes from 2 to 7 days or from 2 to 5 days or from 2 to 4 days (e.g., about 2, about 3, or about 4 days). In various embodiments, the sol-gel is spinnable well before it transitions into a more solidified, non-flowable mass.

The enclosure space for ripening the sol-gel may include a vent on at least one surface for exhausting gases from within the enclosure, and optionally the vent may include a fan for exhausting gases produced during the ripening process. The enclosure space may optionally include a heating source (e.g., one or more heating elements, for example resistive heating elements) for providing a nominal amount of heat within the enclosure space, to maintain a preferred temperature. In some embodiments, a source of humidity (e.g., an open container of water or other aqueous, water-based liquid) is provided within the enclosure environment to adjust the humidity to a desired range or value.

The enclosure may further include one or more environmental monitors, such as a temperature reading device (e.g., a thermometer, thermocouple, or other temperature sensor) and/or a humidity reading device (e.g., a hygrometer or other humidity sensor).

In some embodiments, the sol-gel is electrospun after a ripening process of at least 2 days, or at least 36 hours, or at least 3 days, or at least 4 days, or at least 5 days at the controlled environmental conditions (but in various embodiments, not more than 10 days or not more than 7 days under the controlled environmental conditions). By slowing the ripening process, the ideal time to spin the fibers can be identified. The weight of the sol-gel may be used as an indicator of when the sol-gel is at or near the ideal time to electrospin. Without intending to be bound by theory, it is believed that the viscosity of the sol-gel is a poor determinant for identifying the optimal time for electrospinning. For example, in various embodiments, the sol-gel is from about 10% to about 60% of the original weight of the sol (based on loss of alcohol solvent during transitioning). In some embodiments, the sol-gel is from 15 to 50% of the original weight of the sol, or in the range of about 20 to about 40% of the original weight of the sol.

In some embodiments, the sol-gel is ripened for at least 2 days, or at least 36 hours, or at least 3 days, or at least 4 days, or at least 5 days, and is electrospun when the ethylene vapors produced by the composition are between about 10% and about 40% of the vapors produced by the starting sol, such as in the range of about 10% and about 25%, or in the range of about 10% to about 20%. Ethylene is a colorless flammable gas with a faint sweet and musky odor (which is clearly evident as solvent evaporation slows). Ethylene is produced by the reaction of ethanol and acid. Ethylene may optionally be monitored in the vapors using a conventional ethylene monitor. In other embodiments, gases produced by the sol during the sol ripening process are monitored to determine a suitable or optimal time for electrospinning. Gas profiles may be monitored using gas chromatography.

In various embodiments, the sol-gel may be ripened for a shorter period of time, as long as the sol-gel remains spinnable via electrospinning. The resulting silica fiber mat or collection of fibers may in some cases be more brittle after ripening for a shorter time period, but such brittleness may expedite the fragmenting of the fibers for dispersion into various different compositions (as detailed below).

The processing of the sol-gel mixture may require stirring or other agitation of the mixtures at various intervals or continuously due to the development of silicone dioxide crystalline material on the top surface of the mixtures. This development of crystalline material on the top surface slows the processing time and it is believed that the crystalline material seals off exposure of the mixture to the gaseous vacuum provided within the enclosure space. In some embodiments, any solid crystalline material is removed from the mixture.

Upon completion of the sol-gel process, the sol-gel is then electrospun using any known technique. The sol or sol-gel may be preserved (e.g., frozen or refrigerated) if needed (and such time generally will not apply to the time for ripening). An exemplary process for electrospinning the sol-gel is described in Choi, Sung-Seen, et al., *Silica nanofibers from electrospinning/sol-gel process, Journal of Materials Science Letters* 22, 2003, 891-893, which is hereby incorporated by reference in its entirety. Exemplary processes for electrospinning are further disclosed in U.S. Pat. No. 8,088, 965, which is hereby incorporated by reference in its entirety.

In an exemplary electrospinning technique, the sol-gel is placed into one or more syringe pumps that are fluidly coupled to one or more spinnerets. The spinnerets are connected to a high-voltage (e.g., 5 kV to 50 kV) source and are external to and face toward a grounded collector drum. The drum rotates during spinning, typically along an axis of rotation approximately perpendicular to the spinning direction extending from the spinnerets to the drum. As the sol-gel is supplied to the spinnerets from the syringe pumps (or other holding tank), the high voltage between the spinnerets and the drum forms charged liquid jets that are deposited on the drum as small entangled fibers. As the drum rotates and electrospinning continues, a fibrous mat of silica fibers is formed around the circumference of the drum. In various embodiments, the spinnerets and syringe pump(s) may be disposed on a movable platform that is movable parallel to the length of the drum. In this manner, the length along the drum of the resulting fiber mat may be increased without increasing the number of spinnerets. The diameter of the drum may also be increased to increase the areal size of the electrospun mat. The thickness of the mat may be largely dependent upon the amount of sol-gel used for spinning and thus the amount of electrospinning time. For example, the mat may have a thickness of greater than about ⅛ inch, or greater than about ¼ inch, or greater than about ⅓ inch, or greater than about ½ inch.

Figure 1B:
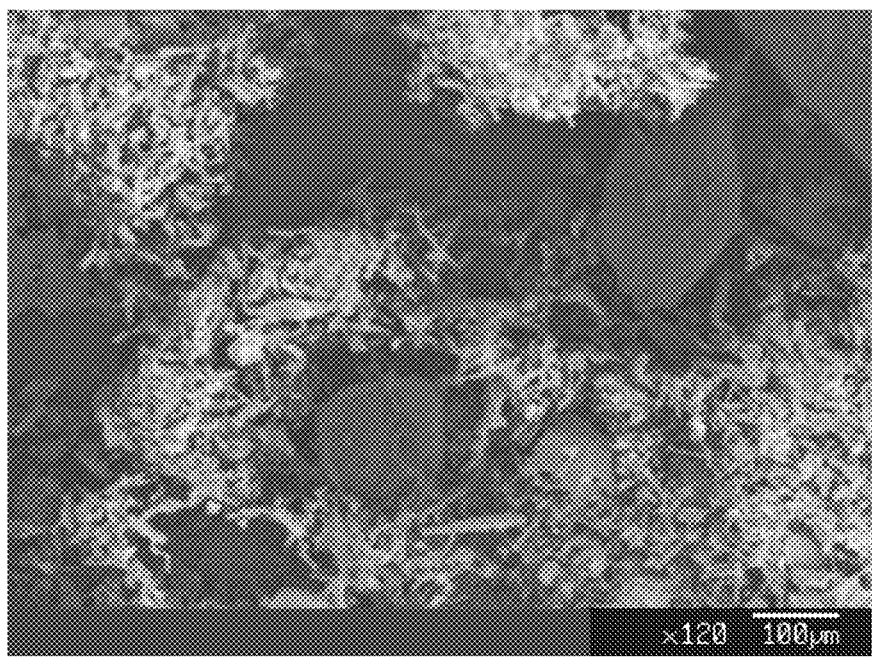

After completion of the electrospinning process, the resulting mat is removed from the drum. For example, the mat may be cut and peeled away from the drum in one or more pieces. The mat may then be divided into small fibrous fragments that may be utilized as an additive in any of a variety of different compositions. In various embodiments, the resulting fibrous fragments are each intertwined collections of silica fibers, rather than unitary solid particles. For example, the electrospun mat may be fractured, cut, ground, milled, or otherwise divided into small fragments that maintain a fibrous structure. The fibers or portions thereof in a fibrous fragment may be held together by, e.g., electrostatic forces, and/or the fibers or fiber portions may be mechanically entangled together. In an embodiment, the mat (or one or more portions thereof) is rubbed through one or more screens or sieves, and the mesh size of the screen determines, at least in part, the size of the resulting fibrous fragments produced from the electrospun mat. For example, the mat or mat portions may be rubbed through a succession of two or more screens having decreasing mesh sizes (e.g., screens having mesh numbers of 100, 200, 300, or even 400), in order to produce a collection of fibrous fragments having the desired sizes. In various embodiments, the average size of a fibrous fragment is in the range of approximately 20 µm to approximately 200 µm. FIGS. 1A and 1B are scanning electron microscopy (SEM) images of collections of silica fibrous fragments produced in accordance with embodiments of the present invention.

In various embodiments, when the mat is divided into fragments, the resulting collection of fragments also includes one or more individual silica fibers or portions thereof. In some embodiments, particularly when dividing the mat into small fragments, one or more, or even each, of the fibrous fragments corresponds to one or more fibers or portions thereof.

After fabrication of the fibrous fragments having the desired size, the fibrous fragments may be mixed into any of a variety of different compositions in order to impart beneficial properties thereto. For example, the fibrous fragments may be mixed into coating or binder materials such as paints, polishes, lacquers, finishes (e.g., for wood), glues, adhesives, epoxies, resins, or sealants. In various embodiments, the fragments are added into the composition at concentrations ranging from approximately 1 gram per quart to approximately 50 grams per quart. Such coating materials may be applied to a variety of different articles to impart one or more beneficial characteristics thereto, for example, cars or other vehicles, boats, houses or other buildings or structures (or portions thereof), helmets or other sports or protective equipment, engine components such as pistons, etc.

Figure 2A:
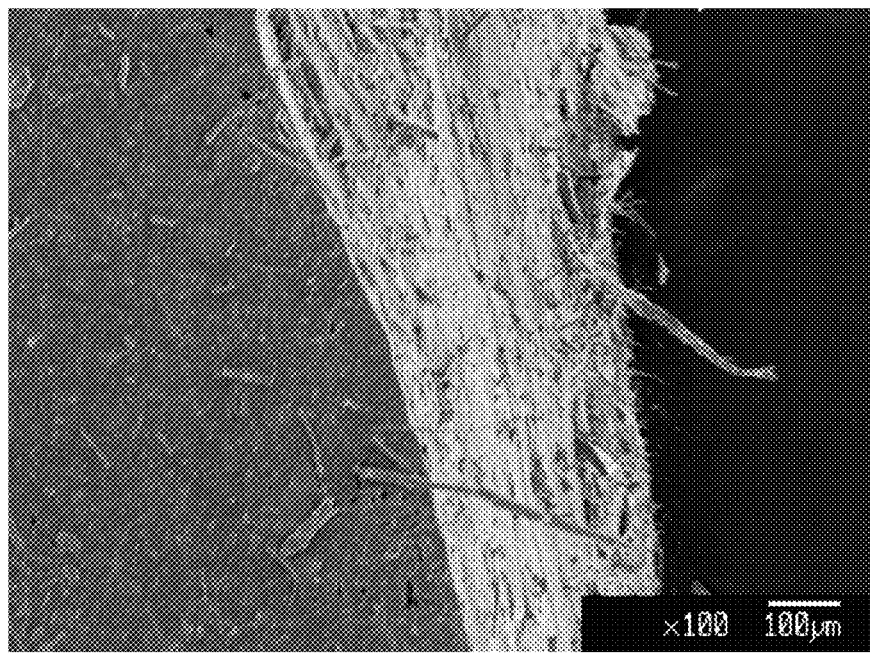
FIGS. 2A and 2B are cross-sectional SEM images of molded polyurethane objects, after curing of the polyurethane, containing silica fibrous fragments embedded therewithin in accordance with embodiments of the present invention.
Figure 2B:
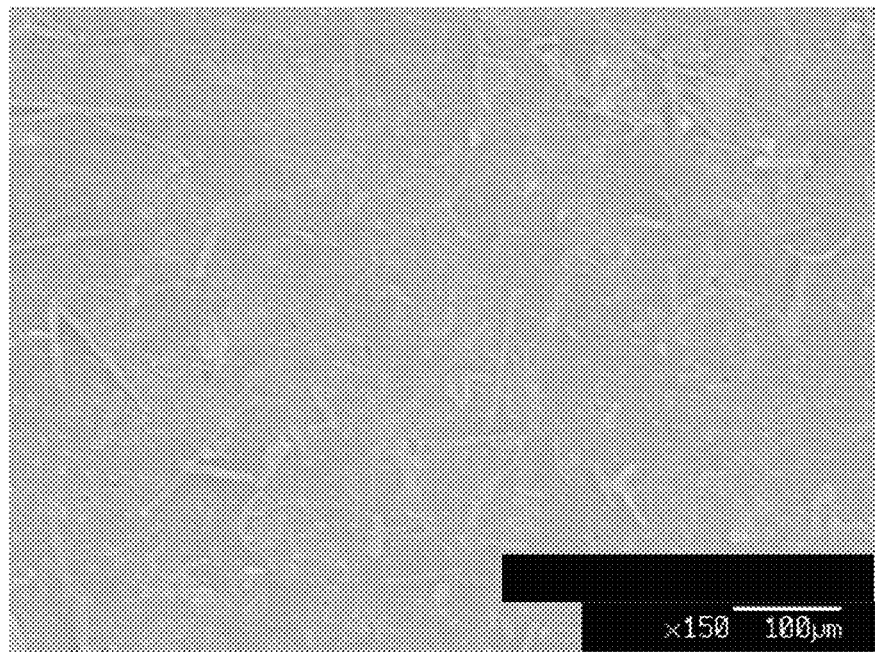
Figure 3A:
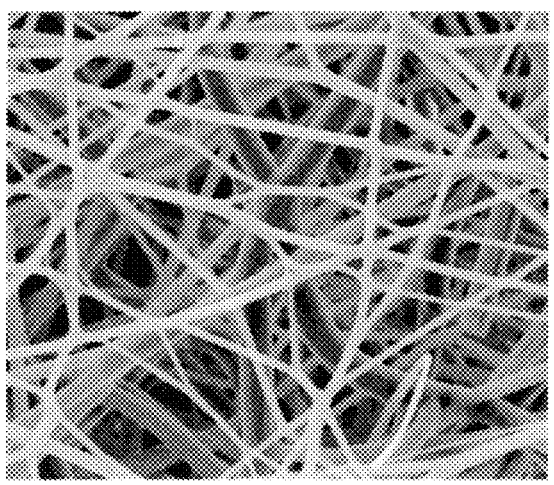
FIGS. 3A-3J are SEM images of silica fibers produced in accordance with embodiments of the present invention.
Figure 3B:
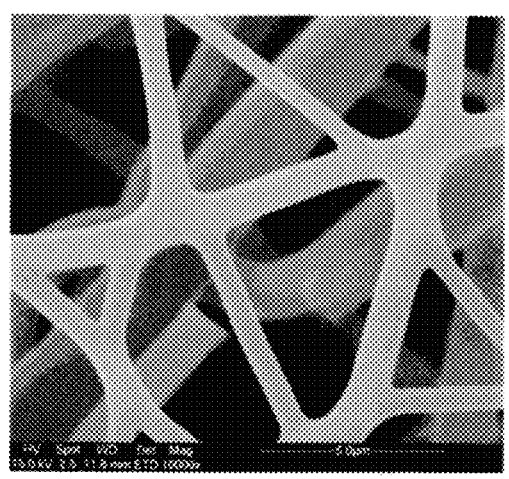
Figure 3C:
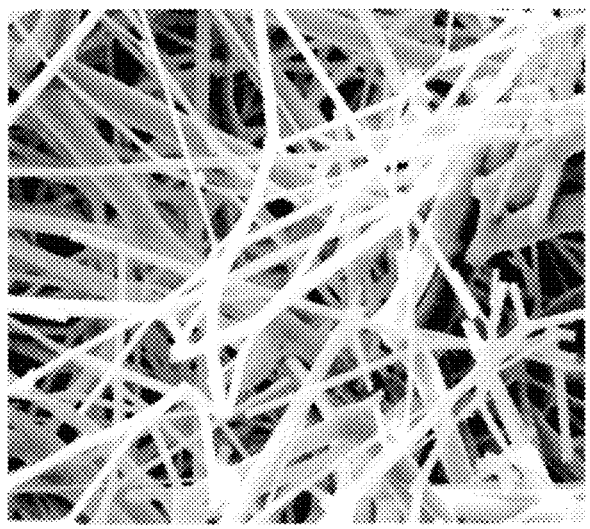
Figure 3D:
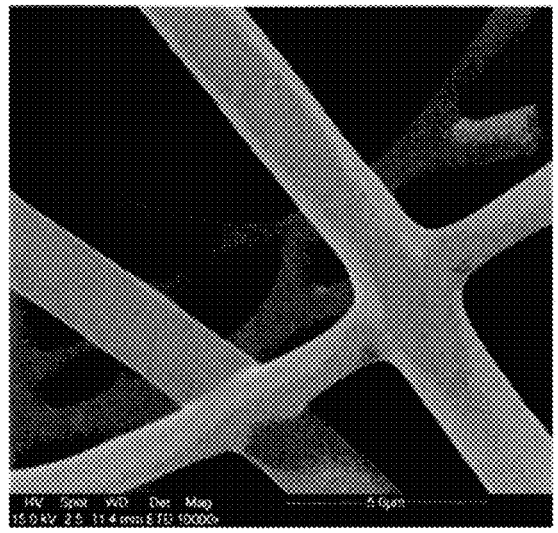
Figure 3E:
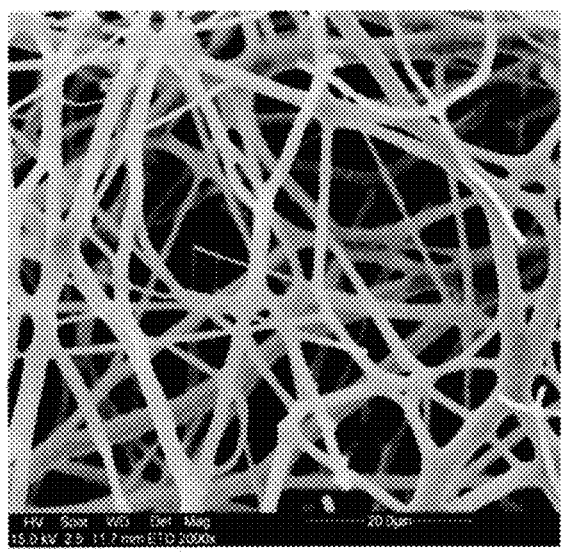
Figure 3F:
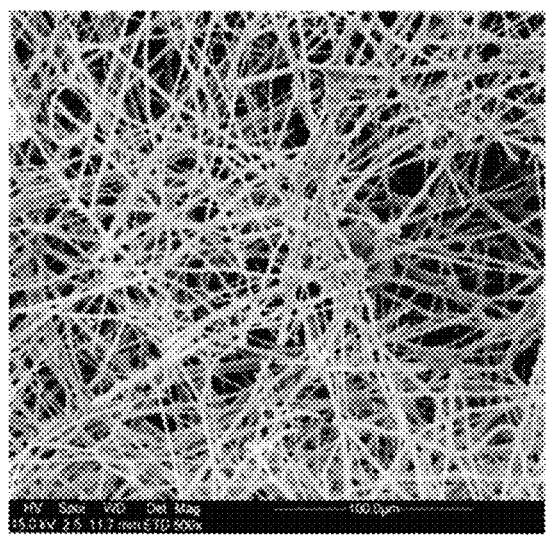
Figure 3G:
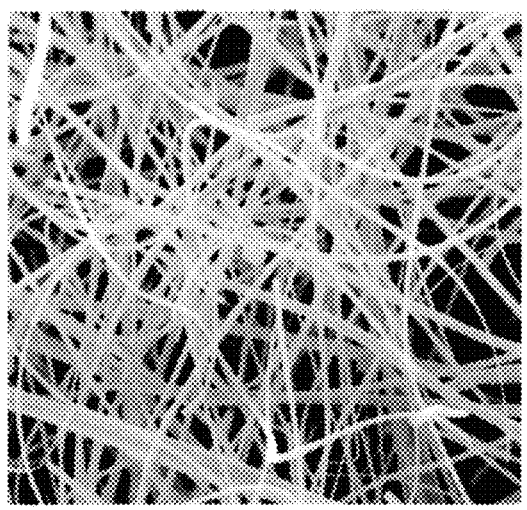
Figure 3H:
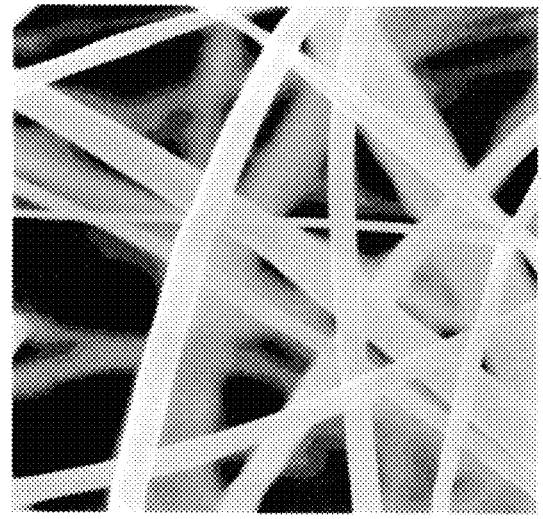
Figure 3I:
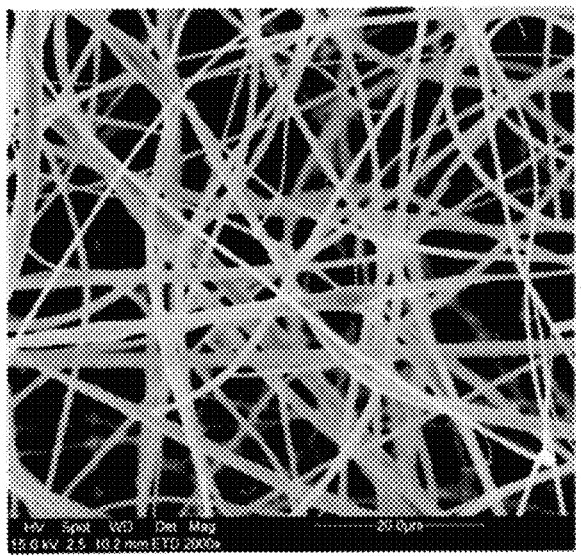
Figure 3J:
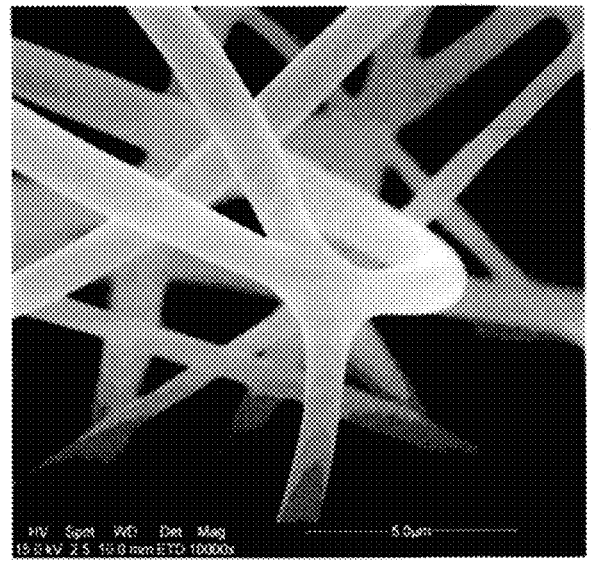

The fibrous fragments may also be mixed into materials utilized for shaping or molding into solid objects such as epoxies, urethanes, thermoplastics, thermosetting plastics, resins, etc. In various embodiments, the fragments are added into the composition at concentrations ranging from approximately 0.5 gram per gallon to approximately 10 grams per gallon. In various embodiments, the fibrous fragments are hydrophobic, and the composition is agitated in order to disperse the fragments therewithin after mixing and/or prior to molding of the composition into a shaped article or coating of the composition onto a surface (e.g., of a solid object or a fabric). Compositions may be molded, pressed, extruded, or otherwise shaped to take the shape of solid objects and cured (before and/or after shaping) with the fragments embedded therewithin. In various embodiments, the fragments are inert to the composition in which they are mixed and do not react chemically therewith. The resulting compositions, coatings, and molded objects may exhibit increased thermal resistance (per unit area), increased mechanical strength, and/or increased impact resistance. FIGS. 2A and 2B are SEM images of molded polyurethane objects, after curing of the polyurethane, containing silica fibrous fragments embedded therewithin in accordance with embodiments of the present invention.

In various embodiments of the invention, the electrospun mat of silica fibers itself (or a portion thereof) is embedded within a material or composition utilized for shaping or molding into solid objects such as epoxies, urethanes, thermoplastics, thermosetting plastics, resins, etc., without further fragmentation into fragments. The mat of fibers may impart improved mechanical strength, R-value, impact resistance, etc.

In an exemplary embodiment of the present invention, a composite material such as particle board is fabricated such that incorporates silica fibrous fragments as detailed herein. As utilized herein, "particle board" refers to any composite or mixed material that includes wood chips, wood fibers, wood powder, and/or other wood particles (and/or chips, fibers, powder, and/or particles derived from other plants or any fibrous lignocellulosic materials), as well as one or more binders (e.g., one or more resins) and that may be shaped (e.g., molded, pressed, and/or extruded) into a solid object (e.g., a sheet, board, plank, flooring or wall or other structural portion, door, subfloor, etc.). Particle board in accordance with embodiments of the invention may also include other components such as, for example, adhesives, waxes, fungicides, dyes, wetting agents, and/or release agents. In various embodiments, wood chips, wood fibers, wood powder, and/or other wood particles are mixed with one or more liquid binders (e.g., one or more resins) such as, for example, urea-formaldehyde, phenol formaldehyde, methylene diphenyl diisocyanate, and/or melamine-urea-formaldehyde. In various embodiments, the binder (and/or any other liquid component) may be sprayed or misted on the wood particles. The resulting mixture may be shaped into the desired object by, e.g., molding, extrusion, and/or pressing. In various embodiments, the binder dries, solidifies, and/or partially evaporates, and the resulting composition is a solid object. Heat may be applied before, during, and/or after shaping to cure and/or dry the binder and/or other liquid components. In accordance with embodiments of the present invention, particle board may also incorporate fibrous fragments fabricated as detailed herein. Such particle board may advantageously exhibit improved fire resistance and/or fire retardance, e.g., an improved R-value. For example, the fibrous fragments may be mixed into the wood and binder mixture prior to shaping of the mixture. Instead or in addition, fibrous fragments, mixed into a liquid composition such as an epoxy or paint may be applied to the particle board after shaping.

The fibrous fragments may also be mixed into a liquid composition, which may subsequently be applied to articles such as fabrics to impart beneficial characteristics thereto. The liquid composition in such embodiments may dry onto the article and become a portion thereof or a layer thereon. For example, silica fiber-containing compositions may be applied to clothing to impart fire resistance or impact resistance thereto in the manner of a fire-resistant suit or an armored or bullet-proof vest.

In various embodiments, the liquid composition itself may be applied to the electrospun mat of silica fibers (or a portion thereof) without further fragmentation of the mat into fragments. That is, the electrospun fiber mat may provide all, or a significant portion, of the mechanical stability, shape, form, etc. of the final article.

In various embodiments, when the fibrous fragments are mixed into a liquid composition, the fibers or portions thereof constituting the fragments may separate from each other, resulting in a dispersion of individual (or small numbers of) silica fibers within the composition. Such fibers may have individual lengths no more than approximately 10×, no more than 5×, or no more than 2× the size of the fragments. In other embodiments, the fibrous fragments may remain substantially intact within the composition.

Paints usable in accordance with embodiments of the present invention may include, consist essentially of, or consist of a binder (i.e., film former) and may include one or more diluents (i.e., solvents or thinners). For example, suitable binders may include, consist essentially of, or consist of synthetic or natural resins, alkyds, acrylics, vinylacrylics, vinyl acetate/ethylene, polyurethanes, polyesters, melamine resins, epoxies, silanes, siloxanes, or oils. Suitable diluents may include, consist essentially of, or consist of, e.g., water, organic solvents, aliphatics, aromatics, alcohols, ketones, petroleum distillate, esters, glycol ethers, and/or synthetic polymers such as acrylic, vinyl acrylic (PVA), or styrene acrylic. Paints may include dispersions of polymer particles therewithin, and/or one or more pigments and/or dyes.

Embodiments of the invention will now be described with respect to the following examples.

EXAMPLES

Example 1: Preparation of Silica Fiber Mat

Silica fibers were prepared using an electrospinning process, in which a sol-gel was spun onto a collector drum to form a non-woven mat of fibers. The sol-gel was made in two parts. First, TEOS was mixed with ethanol, and then a second mixture containing HCl, water, and ethanol was titrated into the mixture. The sol-gel was then allowed to ripen for a few days under controlled conditions before spinning.

In one example, the first sol was made by weighing out 384 grams of TEOS 98% and 41.8 grams of anhydrous denatured ethanol, and pouring together. The first sol was allowed to let stand in a beaker, and a magnetic stirrer was used to create a homogenous solution. The second sol was made by weighing 41.8 grams of anhydrous denatured ethanol, 16.4 grams of distilled water, and 0.34 grams of hydrochloric acid, which was then poured together and mixed for 8 seconds with a magnetic stirrer until a homogenous second sol was formed.

The second sol was then poured into the titration device, which was placed above a beaker containing the first sol. The titration device then dripped about 5 drops per second until a third sol was formed via the mixing of the first sol and the second sol. During the dripping process, the first sol was continuously mixed with a magnetic stirrer while the second sol was dripped into the first sol.

Figure 4:
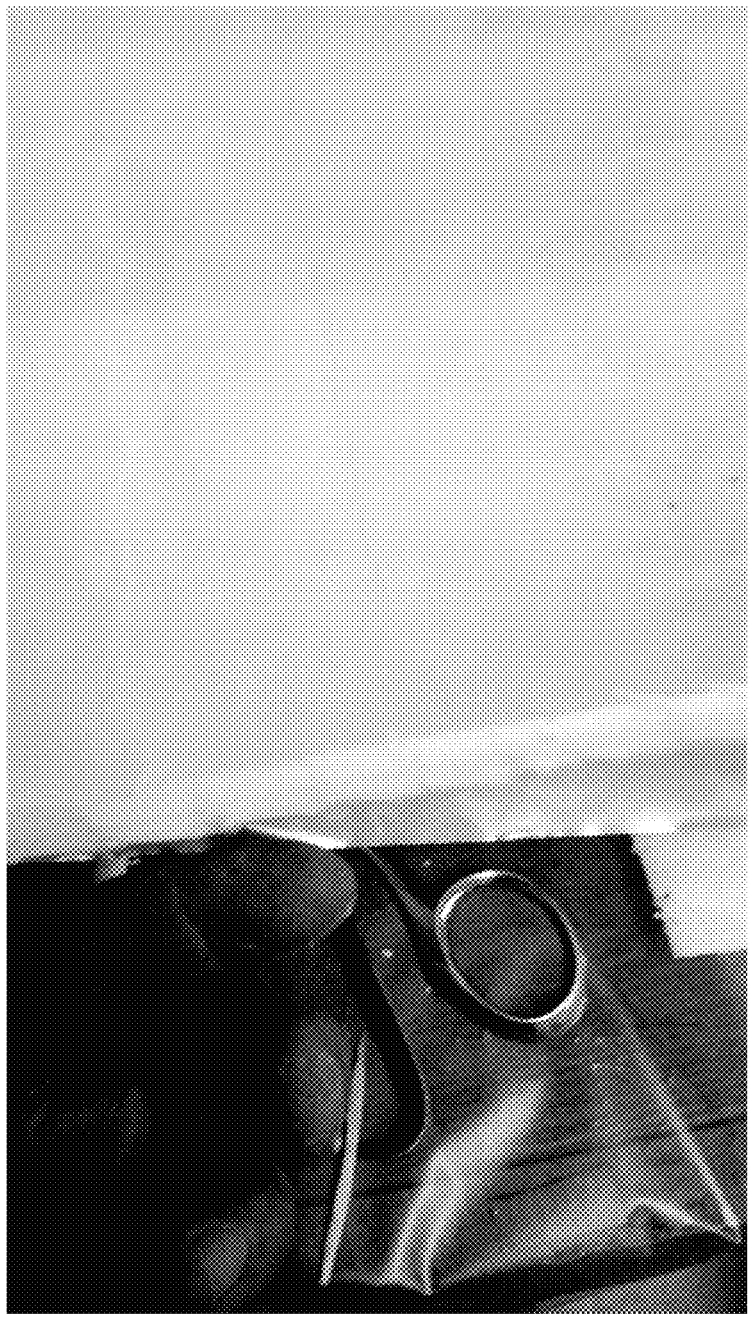
FIG. 4 shows a fiber mat spun with a thickness of about ¼ inch in accordance with embodiments of the present invention.

The combined third sol was then placed into an enclosure box. A low pressure vacuum was provided by a fan on medium speed to remove fumes. The air temperature within the box was 72° F. with 60% humidity. The third sol was allowed to sit and process for about three days. The mixtures were agitated daily to reduce the build-up of crystalline structures. The third sol began to transition to sol-gel with evaporation of the alcohol solvent. Sol-gel may be monitored to determine an approximate amount of $C_2H_4$ (ethylene) in the vapors, which may be in the range of about 10-20% relative to that of the original sol before ripening. Upon proper gelatinization, the sol-gel was loaded into electrospinning machine or was frozen to preserve for electrospinning. In this example, proper gelatinization occurred when the total mass of the sol-gel was between about 70 grams and about 140 grams. This example may be scaled appropriately and the ranges may vary, yet still produce desirable structures. As shown by SEM (FIG. 3A-FIG. 3J), the resulting fibers had variable diameters between about 50 nm and 5 µm. The majority of fibers had a diameter in the range of about 100 nm to about 2 µm. FIG. 4 shows a fiber mat spun with a thickness of about ¼ inch. Once prepared, the silica fiber mat was broken into fragments for subsequent mixing into a variety of different liquid compositions.

Example 2: Silica Fibrous Fragments as an Additive to Epoxy

Figure 5A:
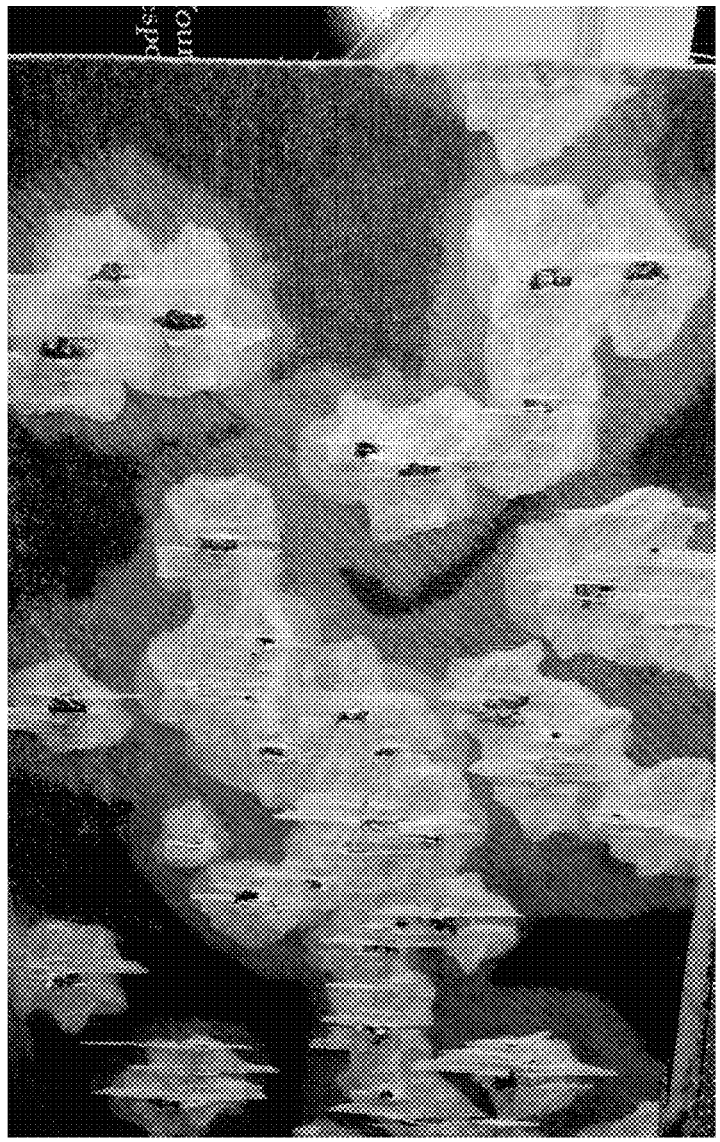
FIG. 5A shows the front side of a molded epoxy resin panel incorporating silica fibrous fragments therewithin in accordance with embodiments of the present invention after ballistics testing; as shown, bullets embedded within the panel.
Figure 5B:
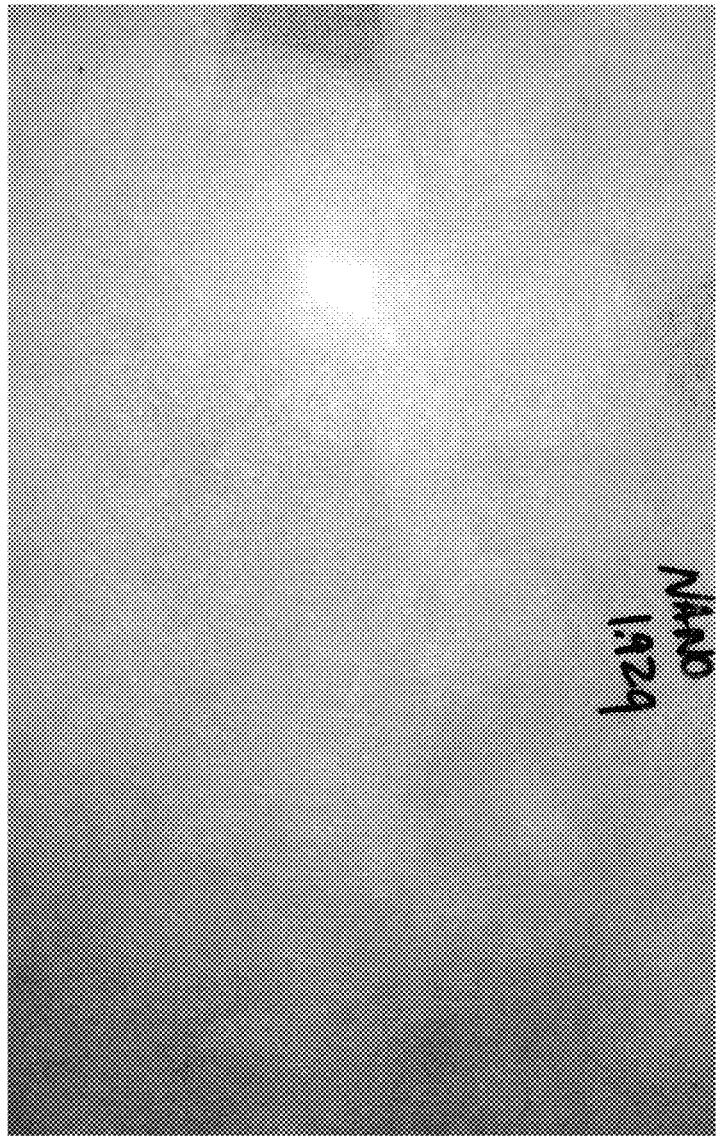
FIG. 5B shows the back side of the panel of FIG. 5B, showing that bullets did not penetrate through the panel during ballistics testing.

A silica fiber mat similar to that fabricated in Example 1 was fabricated and then broken into fragments via rubbing through a series of screens of decreasing mesh size. The final screen was a 200 mesh screen, resulting in fibrous fragments having an average size of approximately 50 µm-approximately 75 µm. The resulting fragments were weighed and added to an epoxy resin composition at a concentration of between 1.90 and 2 grams per gallon. The resulting composition was molded into a rectangular panel having a thickness of approximately ¼ inch via a vacuum infusion process. In order to test the mechanical properties of the molded panel, over 100 rounds of .223, .410, and .357 caliber hollow-point bullets were fired at the panel. The higher velocity, lower caliber bullets bounced off of the panel without penetrating it, while the lower velocity bullets embedded within the panel without penetrating through it. FIG. 5A shows the front side of the tested panel with the 0.357 bullets embedded within it, which FIG. 5B shows the back, undamaged side of the panel after testing. A similar test performed with the same epoxy resin composition without the addition of the fibrous fragments resulted in the bullets easily penetrating through the panel.

Example 3: Silica Fibrous Fragment-Containing Composition as a Cap Liner

Figure 6A:
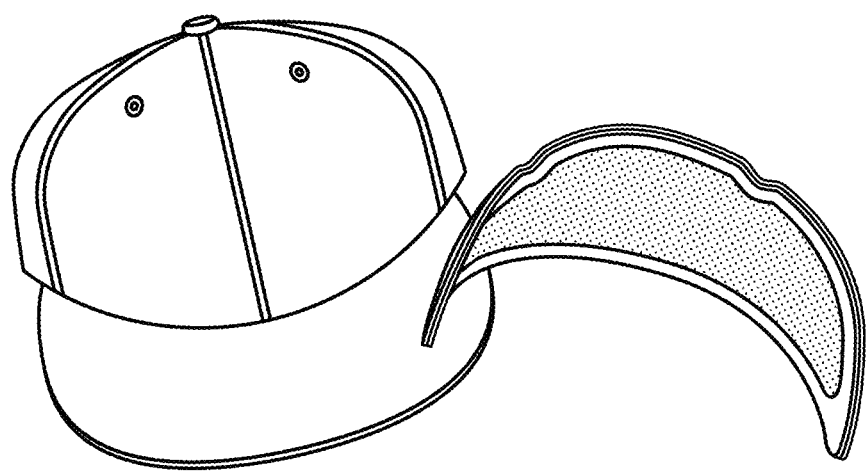
FIG. 6A shows a baseball cap and a liner for the cap that incorporates silica fibrous fragments therewithin in accordance with embodiments of the present invention.
Figure 6B:
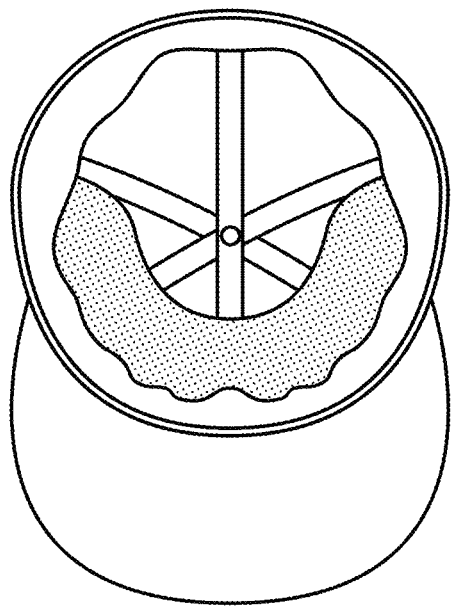
FIG. 6B shows the liner of FIG. 6A fitted into the cap of FIG. 6A for impact testing.
Figure 6C:
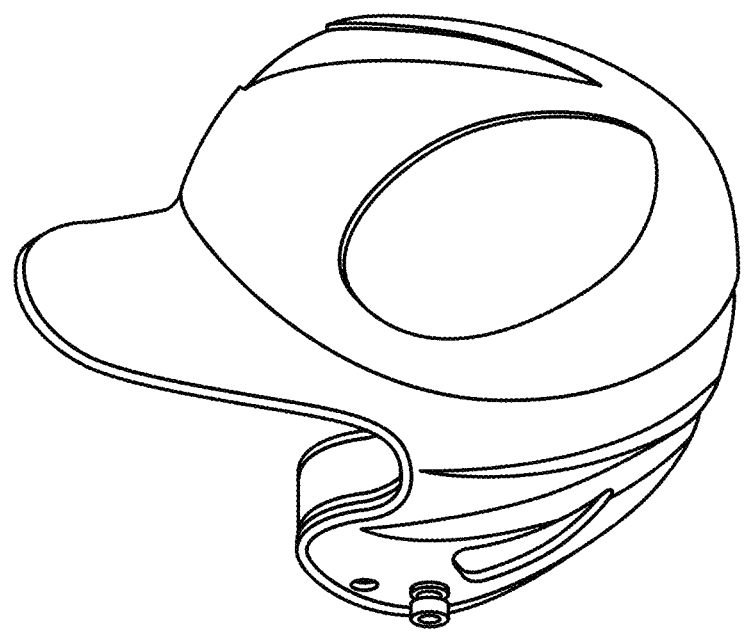
FIG. 6C is an external view of a conventional foam-lined plastic baseball helmet utilized for comparative impact testing.
Figure 6D:
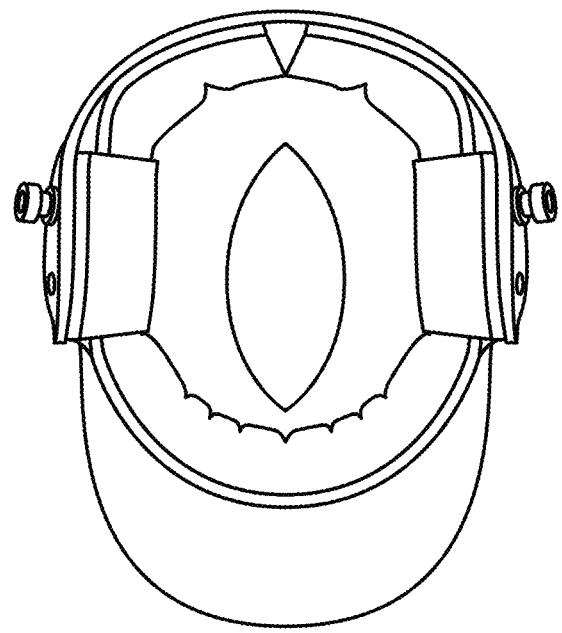
FIG. 6D is an interior view of the helmet of FIG. 6C.

A silica fiber mat similar to that fabricated in Example 1 was fabricated and then broken into fragments via rubbing through a series of screens of decreasing mesh size. The final screen was a 200 mesh screen, resulting in fibrous fragments having an average size of approximately 50 µm-approximately 75 µm. The resulting fragments were weighed and added to a urethane composition at a concentration of between 1 and 5 grams per quart. The resulting composition was molded within a curved mold and placed inside a conventional flexible fabric baseball cap flush with the inner surface of the front-facing portion of the cap above the bill. The liner was approximately 0.1875 inches thick. FIG. 6A shows the baseball cap and the liner prior to insertion within the cap, and FIG. 6B shows the baseball cap with the liner inserted therewithin. An impact test was performed by propelling a conventional baseball toward the lined cap. The same test was performed on a conventional rigid acrylonitrile butadiene styrene (ABS) plastic baseball helmet with a thick impact-resistant foam liner but without the liner containing the silica fibrous fragments in accordance with the invention. FIG. 6C shows an external view of the baseball helmet, while FIG. 6D shows an interior view of the helmet with the impact-resistant foam clearly visible. The strength of the impact during the test was measured utilizing a FlexiForce ELF Force Measurement System available from Tekscan, Inc. of Boston, Massachusetts. The presence of the liner decreased the impact from over 1500 pounds of force (measured in a control experiment without the liner) to approximately 280 pounds of force, which was approximately the same impact force measured for the unlined baseball helmet.

Example 4: Silica Fibrous Fragment-Containing Composition as an Automobile Piston Coating A silica fiber mat similar to that fabricated in Example 1 was fabricated and then broken into fragments via rubbing through a series of screens of decreasing mesh size. The final screen was a 200 mesh screen, resulting in fibrous fragments having an average size of approximately 50 µm-approximately 75 µm. The resulting fragments were weighed and added to a liquid precursor for a ceramic coating conventionally applied to aluminum automobile piston heads for thermal management. The resulting coating was coated on a set of automobile piston heads in an internal combustion engine. Separately, another engine was equipped with the same type of pistons with only the conventional ceramic coating. After operation of the engines, the temperature below the pistons was measured. This temperature, proximate the piston crank and other portions of the engine, is desirably as cool as possible, particularly compared to the upper portion of the pistons, where higher temperatures improves performance. The coating including the silica fibrous fragments prevented more heat transfer below the piston, which improves the piston's heat reflection and transfers part of the detonation energy into the fuel burning phase, thereby resulting in higher fuel burning efficiency and reduced carbon accumulation, which in turn makes detonation more effective. Specifically, the temperature measured below the piston coated with the coating containing the fibrous fragments was approximately 240° F., while the temperature measured blow the piston coated with the conventional coating was approximately 500° F., thus demonstrating the efficacy of the fibrous-fragment-based coating in resisting thermal conduction through and below the pistons.

Example 5: Silica Fibrous Fragment-Containing Adhesive Composition

Figure 7A:
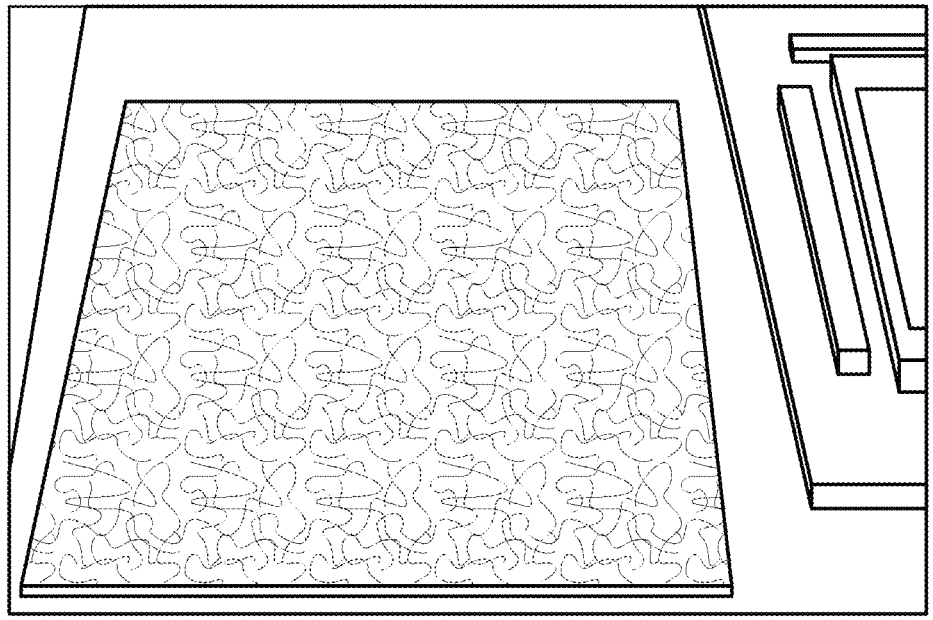
FIG. 7A shows the bottom side of an aluminum sheet treated with a thermal adhesive incorporating silica fibrous fragments therewithin in accordance with embodiments of the present invention.
Figure 7B:
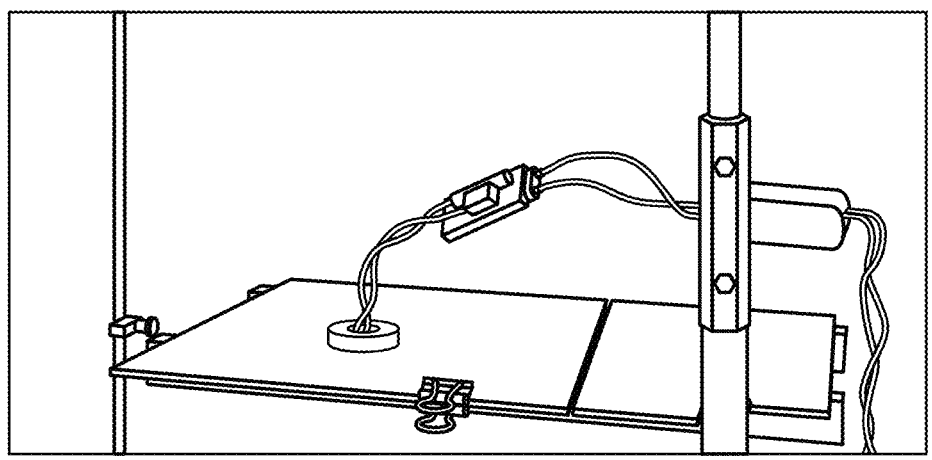
FIG. 7B shows the untreated top side of the aluminum sheet of FIG. 7A.
Figure 7C:
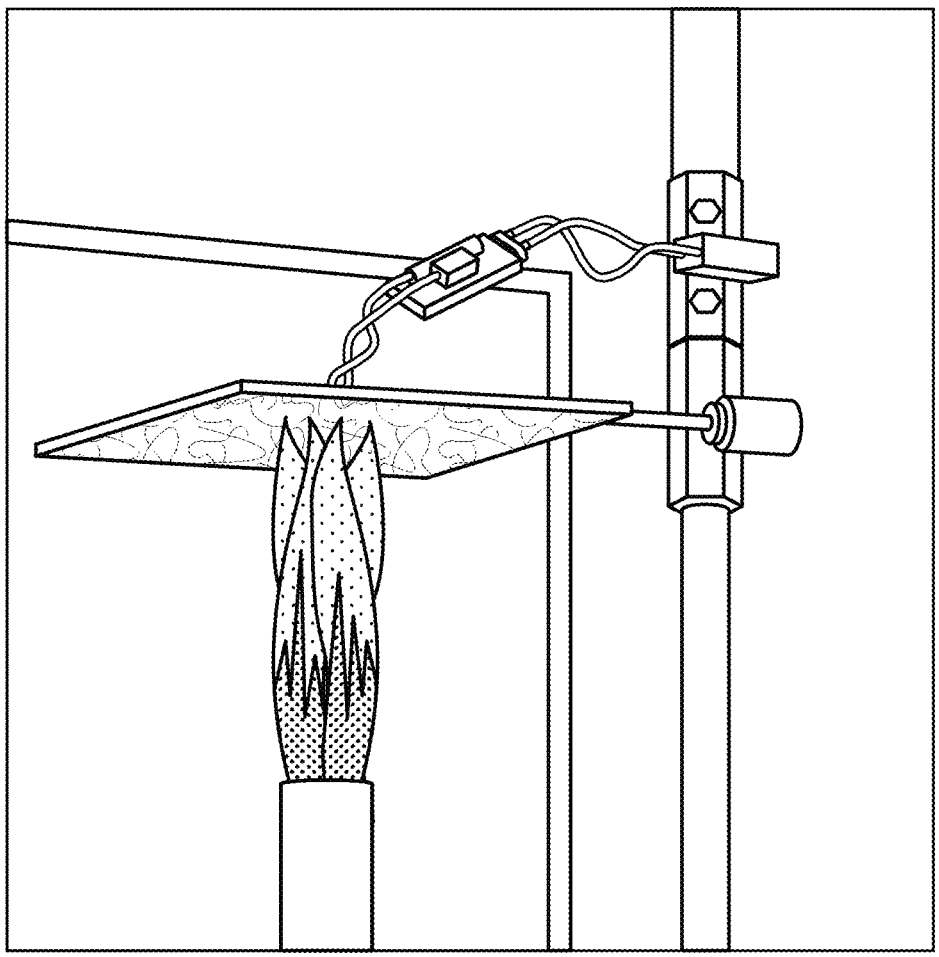
FIG. 7C shows application of a flame to the treated side of the aluminum sheet of FIGS. 7A and 7B during flame testing.

A silica fiber mat similar to that fabricated in Example 1 was fabricated and then broken into fragments via rubbing through a series of screens of decreasing mesh size. The final screen was a 200 mesh screen, resulting in fibrous fragments having an average size of approximately 50 μm-approximately 75 μm. The resulting fragments were weighed and added to a conventional thermal adhesive rated for heat exposures up to 500° F. for time periods up to 30 seconds. The resulting adhesive composition was applied to one side of an aluminum sheet having a thickness of 0.020 inch. A thermocouple was attached to the untreated side. FIGS. 7A and 7B respectively show the treated side and the untreated side of the aluminum sheet. A propane torch was positioned below the aluminum sheet, and the treated side of the sheet faced the torch. The top of the burner was approximately 9.375 inches below the treated surface of the sheet. The burner was then lit and allowed to burn at a propane flow rate of 12.5 slpm for two hours. FIG. 7C depicts the aluminum sheet being subjected to the flame from the propane torch. During the test, the flame temperature remained steady at approximately 2100° F., i.e., well above the rated temperature of the adhesive composition and above the melting point of aluminum. The temperature measured on the untreated side of the aluminum sheet remained at approximately 1100° F. for the duration of the test, and the aluminum sheet did not melt.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of making a composition, the method comprising:
   electrospinning a sol-gel to form a non-woven mat of silica fibers;
   coating at least a portion of the mat with a liquid composition or immersing at least a portion of the mat within a liquid composition; and
   curing the liquid composition.

2. The method of claim 1, wherein the liquid composition comprises a paint, an epoxy, a urethane, or an adhesive.

3. The method of claim 1, wherein the sol-gel is prepared with tetraethylorthosilicate (TEOS).

4. The method of claim 1, further comprising, prior to electrospinning the sol-gel, producing the sol-gel from an initial sol comprising 70% to 90% TEOS by weight, 8% to 25% ethanol by weight, an acid catalyst, and water.

5. The method of claim 4, wherein the initial sol is free of inorganic salts.

6. The method of claim 4, wherein producing the sol-gel comprises ripening the initial sol for at least 2 days at a humidity of 40% to 80% and a temperature of 50° F. to 90° F.

7. The method of claim 6, wherein the initial sol is ripened for at least 3 days.

8. The method of claim 6, wherein the sol-gel is electrospun when the weight of the sol-gel ranges from 10% to 60% of a starting weight of the initial sol prior to ripening.

9. The method of claim 6, wherein the sol-gel is electrospun when production of ethylene vapor therefrom ranges from 10% to 40% relative to the initial sol prior to ripening.

10. The method of claim 4, wherein the initial sol is not exposed to a temperature of over 150° F. before or during production of the sol-gel.

11. The method of claim 4, wherein the initial sol is not exposed to a temperature of over 100° F. before or during production of the sol-gel.

12. The method of claim 4, wherein producing the sol-gel from the initial sol comprises ripening the initial sol within an enclosure, the enclosure comprising, for controlling an atmosphere within the enclosure during ripening of the initial sol, (i) a humidity sensor and a humidifier configured to control humidity within the enclosure, and (ii) a vent and a fan configured to draw gases away from the initial sol.

13. The method of claim 12, wherein the humidifier is configured to control the humidity within the enclosure to a level of 40% to 80%.

14. The method of claim 1, wherein the liquid composition is a paint, the paint comprising a binder, one or more diluents, and one or more pigments or dyes.

15. The method of claim 1, wherein, prior to electrospinning, the sol-gel is not exposed to a temperature of over 150° F.

16. The method of claim 1, wherein, prior to electrospinning, the sol-gel is not exposed to a temperature of over 100° F.

17. The method of claim 1, wherein the liquid composition comprises a silica fiber powder therewithin.

18. The method of claim 17, further comprising forming the silica fiber powder by:
   electrospinning a second sol-gel to form a second non-woven mat of silica fibers; and
   fragmenting the second mat to form the silica fiber powder.

19. The method of claim 18, further comprising, prior to electrospinning the second sol-gel, producing the second sol-gel from a second initial sol comprising 70% to 90% tetraethylorthosilicate (TEOS) by weight, 8% to 25% ethanol by weight, an acid catalyst, and water.

20. The method of claim 19, wherein the second initial sol is free of inorganic salts.

* * * * *